US012083793B2

(12) United States Patent
Okushima et al.

(10) Patent No.: US 12,083,793 B2
(45) Date of Patent: Sep. 10, 2024

(54) INKJET PRINTING APPARATUS

(71) Applicant: SCREEN HOLDINGS CO., LTD., Kyoto (JP)

(72) Inventors: Tomoyasu Okushima, Kyoto (JP); Tomonori Yasuda, Kyoto (JP); Akihiro Ogawa, Kyoto (JP)

(73) Assignee: SCREEN HOLDINGS CO., LTD., Kyoto (JP)

( * ) Notice: Subject to any disclaimer, the term of this patent is extended or adjusted under 35 U.S.C. 154(b) by 112 days.

(21) Appl. No.: 17/796,457

(22) PCT Filed: Mar. 16, 2021

(86) PCT No.: PCT/JP2021/010608
§ 371 (c)(1),
(2) Date: Jul. 29, 2022

(87) PCT Pub. No.: WO2021/200117
PCT Pub. Date: Oct. 7, 2021

(65) Prior Publication Data

US 2023/0048119 A1 Feb. 16, 2023

(30) Foreign Application Priority Data

Mar. 31, 2020 (JP) ................................ 2020-062877

(51) Int. Cl.
*B41J 2/045* (2006.01)

(52) U.S. Cl.
CPC ....... *B41J 2/04573* (2013.01); *B41J 2/04505* (2013.01); *B41J 2/04586* (2013.01)

(58) Field of Classification Search
CPC ................ B41J 2/04573; B41J 2/04505; B41J 2/04586; B41J 15/046; B41J 11/008; B41J 11/42; B41J 2/04551
See application file for complete search history.

(56) References Cited

U.S. PATENT DOCUMENTS

2008/0136856 A1* 6/2008 Azami .................. B41J 2/2128 347/16
2013/0271518 A1 10/2013 Morita et al.
(Continued)

FOREIGN PATENT DOCUMENTS

JP 2006-272764 A 10/2006
JP 2009-298027 A 12/2009
(Continued)

OTHER PUBLICATIONS

International Search Report issued in corresponding International Patent Application No. PCT/JP2021/010608, dated Jun. 8, 2021, with English translation.

*Primary Examiner* — Justin Seo
*Assistant Examiner* — Tracey M McMillion
(74) *Attorney, Agent, or Firm* — Rimon P.C.

(57) ABSTRACT

To provide an inkjet printing apparatus capable of continuing printing even during speed change of web paper WP, a transport controller of this invention controls drive rollers, and to make constant at each point of time during the speed change of the drive rollers, a speed difference which is a difference between a first speed which is a transporting speed of web paper when the upstream nozzle dispenses an ink droplet and a second speed which is a transporting speed of web paper when a downstream nozzle dispenses an ink droplet. In this way, a constant relationship is realized, at each point of time during the speed change of drive rollers, between a landing position on the web paper of the ink droplet relating to the upstream nozzle and a landing position on the web paper of the ink droplet relating to the downstream nozzle.

5 Claims, 7 Drawing Sheets

(56) References Cited

U.S. PATENT DOCUMENTS

| | | | |
|---|---|---|---|
| 2014/0049575 | A1 | 2/2014 | Leighton et al. |
| 2019/0054739 | A1* | 2/2019 | Yasuda ................ B41J 2/04586 |

FOREIGN PATENT DOCUMENTS

| | | | |
|---|---|---|---|
| JP | 2013-203048 | A | 10/2013 |
| JP | 2013-220584 | A | 10/2013 |
| JP | 2019-010751 | A | 1/2019 |
| JP | 2019-034501 | A | 3/2019 |

* cited by examiner

INKJET PRINTING APPARATUS

RELATED APPLICATIONS

This application is the U.S. National Phase application under 35 U.S.C. § 371, of international 0Application No. PCT/JP2021/010608, filed on Mar. 16, 2021, which in turn claims the benefit of Japanese Application No. 2020-062877, filed on Mar. 31, 2020, the disclosures of which Applications are incorporated by reference herein.

TECHNICAL FIELD

This invention relates to an inkjet printing apparatus for performing printing by dispensing ink from nozzles while transporting a printing medium.

In recent years, inkjet printing apparatus have been developed that perform printing by dispensing ink droplets. An apparatus with such construction has a plurality of heads, and performs printing by dispensing inks to a printing medium from a plurality of nozzles arrayed on the heads.

The plurality of heads are arranged as spaced from one another in a transport direction of the printing medium such as paper. A nozzle located upstream in a transport path of the printing medium is regarded here as upstream nozzle, and a nozzle located downstream in the transport path of the printing medium as downstream nozzle. When the upstream nozzle and downstream nozzle dispense ink droplets at the same time to the printing medium transported at a constant speed, landing positions of the ink droplets on the printing medium are separated from each other by a distance corresponding to the distance between the nozzles. This phenomenon is obstructive to an agreement in the landing positions of the ink droplets between the upstream nozzle and downstream nozzle.

So, according to the conventional apparatus, an attempt has been made to shift the timing of the downstream nozzle dispensing the ink droplet from the timing of the upstream nozzle dispensing the ink droplet. That is, the conventional apparatus dispenses the ink droplet from the downstream nozzle when the printing medium is transported a predetermined distance after dispensing the ink droplet from the upstream nozzle. This creates a time lag from the landing on the printing medium of the ink droplet of the upstream nozzle to the landing on the printing medium of the ink droplet of the downstream nozzle.

Description will be made as to how the ink droplets dispensed from the two nozzles land on the printing medium in the conventional apparatus. First, the ink droplet is dispensed from the upstream nozzle toward the printing medium, and this ink droplet lands on the printing medium. The landing position of the ink droplet of the upstream nozzle moves away from the upstream nozzle toward the downstream nozzle by transportation of the printing medium, before the downstream nozzle dispenses the ink droplet. At this time, the downstream nozzle dispenses the ink droplet toward the printing medium. While the ink droplet of the downstream nozzle flies through a gap provided between the downstream nozzle and the printing medium, the landing position of the ink droplet of the upstream nozzle on the printing medium moves as far as the downstream nozzle. And the ink droplet of the downstream nozzle lands on the printing medium in the landing position of the ink droplet of the upstream nozzle. Thus, the upstream nozzle and downstream nozzle can make the ink droplets land in the same position on the printing medium.

PRIOR ART DOCUMENT

Patent Document

[Patent Document 1] Unexamined Patent Publication No. 2013-203048

SUMMARY OF INVENTION

Technical Problem

However, the conventional apparatus with such construction has the following problem.

That is, the conventional apparatus is insufficient in consideration of the case of printing while changing the transporting speed. For example, when executing a start of printing, an end or halt of printing, it is necessary to change the transporting speed of the printing medium. When printing is performed as usual during acceleration of the printing medium at the time of starting printing, or during deceleration of the printing medium at the time of ending or halting printing, the ink dispensation will be carried out to establish the above-noted time lag while changes are occurring to the transporting speed of the printing medium. The conventional ink dispensation mode assumes the case of a constant transporting speed of the printing medium. Consequently, the printing performed during acceleration or deceleration of the printing medium will result in a situation where the landing position relating to the upstream nozzle and the landing position relating to the downstream nozzle are displaced from each other. Furthermore, the displacement will change with speed change of the printing medium. Then, the tinge and the like of prints on the printing medium will change. Thus, the conventional apparatus cannot perform printing of acceptable quality during acceleration or deceleration of the printing medium.

Consequently, the conventional apparatus cannot perform printing at the time of start or halt of printing, and ink dispensation is performed only while the transporting speed of the printing medium is steady. The times of change in the transporting speed become preparation periods for printing. Since the printing medium continues to be transported also in this preparation period, the printing medium will be wasted accordingly.

This invention has been made having regard to the state of the art noted above, and its object is to provide a printing apparatus capable of high-quality printing even when the transporting speed of the printing medium is being changed.

Solution to Problem

Inventor of this invention has acquired the following views as a result of research. The reason that high-quality printing cannot be performed at the time of start or halt of printing lies in that the distance (landing distance) from the landing position of an ink droplet relating to the upstream nozzle to the landing position of an ink droplet relating to the downstream nozzle changes with time.

To fulfill the above object, this invention provides the following construction.

An inkjet printing apparatus according to this invention is an inkjet printing apparatus for executing printing by dispensing ink droplets to a printing medium in transportation, comprising drive rollers arranged along a transport path of the printing medium for transporting the printing medium; an encoder for measuring transporting distances of the printing medium by the drive rollers; a printing unit having an upstream nozzle located upstream in the transport path, and a downstream nozzle located downstream of the upstream nozzle in the transport path; a printing unit controller for controlling the printing unit based on an output of the encoder, after the upstream nozzle dispenses an ink droplet toward a specific position on the printing medium, to cause the downstream nozzle to dispense an ink droplet at a point of time the specific position has been transported just a predetermined distance; and a drive roller controller for controlling speed change of the drive rollers in order to control a transporting speed of the printing medium; wherein the drive roller controller is configured to control the drive rollers to make constant at each point of time during the speed change of the drive rollers, a speed difference which is a difference between a first speed which is a transporting speed of the printing medium when the upstream nozzle dispenses the ink droplet and a second speed which is a transporting speed of the printing medium when the downstream nozzle dispenses the ink droplet.

[Functions and effects] According to the above construction, printing can be continued even during speed change of the printing medium. That is, according to this invention, the drive roller controller controls the drive rollers to make constant at each point of time during the speed change of the drive rollers, a speed difference which is a difference between a first speed which is a transporting speed of the printing medium when the upstream nozzle dispenses the ink droplet and a second speed which is a transporting speed of the printing medium when the downstream nozzle dispenses the ink droplet. In this way, a constant relationship is realized, at each point of time during the speed change of the drive rollers, between the landing position on the printing medium of the ink droplet relating to the upstream nozzle and the landing position on the printing medium of the ink droplet relating to the downstream nozzle. Consequently, the tinge and the like of prints on the printing medium will never change during the speed change of the printing medium, thus assuring high quality printing.

In the above inkjet printing apparatus, it is preferred that the printing unit controller is configured to control dispensation timing of the ink droplet from the downstream nozzle to realize an agreement between a first landing position which is a landing position on the printing medium of the ink droplet dispensed from the upstream nozzle and a second landing position which is a landing position on the printing medium of the ink droplet dispensed from the downstream nozzle.

[Functions and effects] The above construction indicates a more specific construction of this invention. The agreement between the first landing position and second landing position can prevent blurring and the like of prints.

It is preferred that the above inkjet printing apparatus further comprises an input unit for inputting instructions to change the transporting speed of the printing medium; wherein the printing unit controller is configured to operate according to one of a plurality of control modes including at least a constant speed mode which is a control mode of the printing unit while the transporting speed of the printing medium is constant, and a speed change mode which is a control mode of the printing unit while the transporting speed of the printing medium is changing, and to switch the control mode from the constant speed mode to the speed change mode when an input is made to the input unit.

[Functions and effects] The above construction indicates a more specific construction of this invention. With the printing unit controller operable to use the constant speed mode and speed change mode separately, the agreement between the first landing position and second landing position can be assured even during the speed change of the transporting speed of the printing medium.

In the above inkjet printing apparatus, it is preferred that the printing unit controller is configured, during the speed change of the drive rollers, to control manipulation of ink droplet dispensation timing of the printing unit by the same control as when the transporting speed of the printing medium is constant.

[Functions and effects] The above construction indicates a more specific construction of this invention. If, during the speed change of the drive rollers, the printing unit controller performs the same control as when the transporting speed of the printing medium constant, the control of the apparatus can be further simplified.

It is preferred that the above inkjet printing apparatus comprises a storage unit for storing patterns of the speed change of the drive rollers; wherein the drive roller controller is operable by reading the patterns from the storage unit.

[Functions and effects] The above construction indicates a more specific construction of this invention. The drive roller controller operable by reading the patterns from the storage unit can reliably carry out the control relating to the transportation of the printing medium in this invention.

Advantageous Effects of Invention

According to this invention, printing can be continued even during speed change of the printing medium. That is, according to this invention, the drive roller controller controls the drive rollers to make constant at each point of time during the speed change of the drive rollers, a speed difference which is a difference between a first speed which is a transporting speed of the printing medium when the upstream nozzle dispenses the ink droplet and a second speed which is a transporting speed of the printing medium when the downstream nozzle dispenses the ink droplet. In this way, a constant relationship is realized, at each point of time during the speed change of the drive rollers, between the landing position on the printing medium of the ink droplet relating to the upstream nozzle and the landing position on the printing medium of the ink droplet relating to the downstream nozzle. Consequently, the tinge and the like of prints on the printing medium will never change during the speed change of the printing medium, thus assuring high quality printing.

DESCRIPTION OF EMBODIMENTS

An embodiment of this invention will be described hereinafter with reference to the drawings. As one example of printing media in this invention, paper (e.g. roll paper) may be cited.

[Embodiment]

Figure 1:
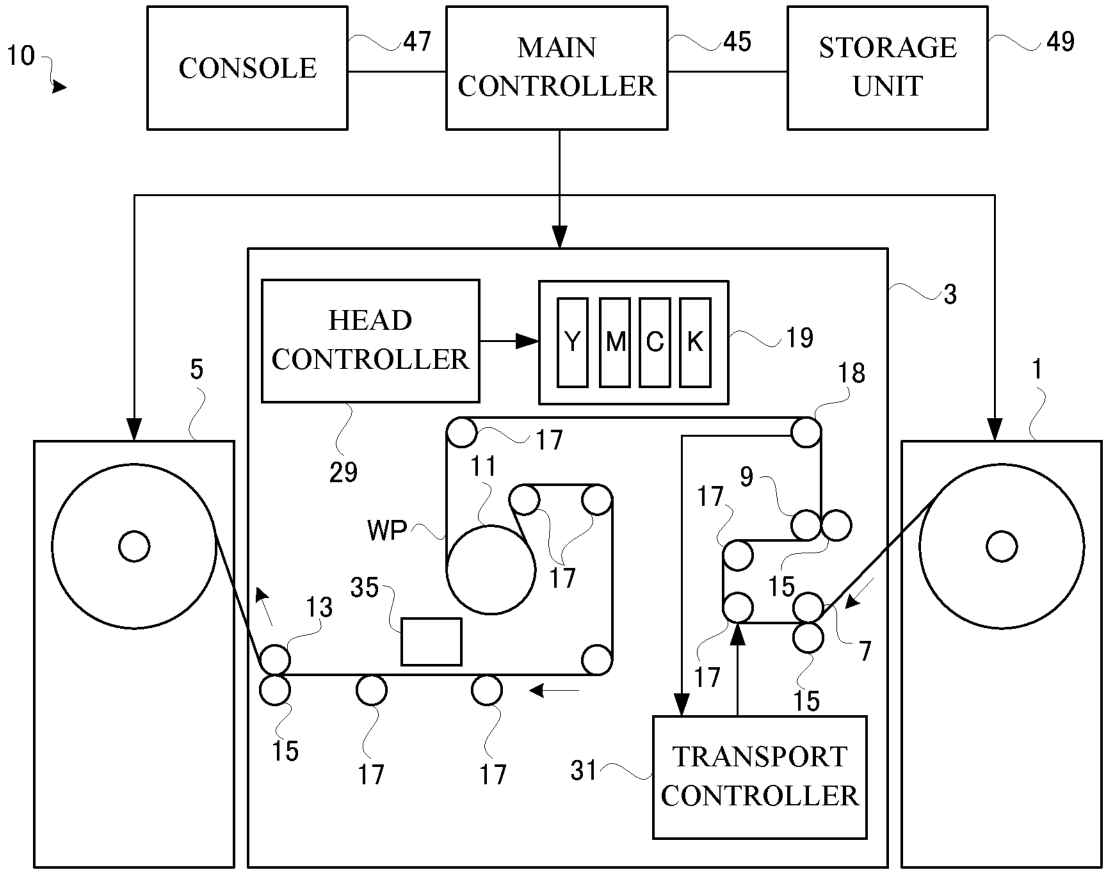
FIG. 1 is a functional block diagram illustrating an overall construction of an inkjet printing apparatus according to this invention.

FIG. 1 shows an overall construction of an inkjet printing apparatus 10 according to the embodiment. The inkjet printing apparatus 10 according to the embodiment performs printing by dispensing ink droplets toward web paper WP being transported. And the inkjet printing apparatus 10 includes a paper feeder 1 for holding roll paper to be printed, a printing apparatus body 3, and a takeup roller 5 for holding printed roll paper.

The paper feeder 1 holds a roll of web paper WP to be rotatable about a horizontal axis, and unwinds and feeds the web paper WP to the printing apparatus body 3. The takeup roller 5 takes up on a horizontal axis the web paper WP printed in the printing apparatus body 3. Referring to the side of feeding the web paper WP as upstream and the side of discharging the web paper WP as downstream, the paper feeder 1 is located upstream of the printing apparatus body 3, and the takeup roller 5 is located downstream of the printing apparatus body 3.

The printing apparatus body 3 has a plurality of drive rollers 7, 9, 11, and 13 arranged from upstream to downstream along a transport path of the web paper WP for performing roll transportation of the web paper WP paid out of the paper feeder 1 toward the takeup roller 5. Among these, the drive rollers 7, 9, and 13 cooperate with presser rollers 15, respectively, to pinch and transport the web paper WP. The drive roller 11 is a heating roller for drying the ink printed on the web paper WP. The heating roller does not have a presser roller, whereby the printed ink before drying will never adhere to the presser roller. Besides the drive rollers 7, 9, and 13, the transport path of web paper WP includes a plurality of guide rollers 17 for guiding the web paper WP.

An encoder 18 is one type of roller that guides the web paper WP like the guide rollers 17. The encoder 18 is different from the other guide rollers 17, and includes a sensor for detecting transporting speeds of the web paper WP. Consequently, the encoder 18 can output signals indicating the transporting speeds of the web paper WP to a transport controller 31. A main controller 45, by referring to the output signals of the encoder 18, can measure transporting distances of the web paper WP transported by the drive rollers 7, 9, 11, and 13 in given time periods.

A printing unit 19 of the inkjet mode is provided downstream of the encoder 18. The printing unit 19 includes line heads with nozzles arrayed thereon for dispensing ink droplets. Specifically, separate line heads for black (K), cyan (C), magenta (M), and yellow (Y), for example, are arranged in order from upstream along the transport path of the web paper WP. The line heads extend in a horizontal direction perpendicular to the transport direction of the web paper WP. Consequently, printing can be done without the heads moving in a printing area in the transverse direction of the web paper WP. That is, the inkjet printing apparatus 10 according to the embodiment is a one-path type printing apparatus. As described hereinafter, the printing unit 19 has upstream nozzles NU located upstream on the transport path of the web paper WP and downstream nozzles ND located downstream of the upstream nozzles NU on the transport path.

Downstream of the drive roller 11 acting as the heating roller is an inspecting unit 35 having an image sensor. The inspecting unit 35 checks whether any position gaps have occurred to prints, and whether the printed portions have stains, omissions and other defects.

Further, the printing apparatus body 3 includes a plurality of tension sensors, not shown, provided along the transport path of web paper WP. The tension sensors are constructions for detecting tension acting on the web paper WP.

Constructions relating to control of the printing apparatus body 3 will be described. A head controller 29 is a construction for controlling each line head of the printing unit 19. The head controller 29 controls drive timing of each nozzle of the printing unit 19 by referring to the output signals of the encoder 18. Each nozzle dispenses ink droplets under control of the head controller 29. The head controller 29 corresponds to the printing unit controller in this invention.

The transport controller 31 carries out feedback control of motors, not shown, connected to the drive rollers 7, 9, 11, and 13 for transporting the web paper WP at a transporting speed specified by a main controller 45, described hereinafter, based on an output of the encoder 18. The main controller 45 performs an overall control of the components of the inkjet printing apparatus 10. A console 47 inputs to the main controller 45 various instructions of the operator, such as changes in the transporting speed of web paper WP. A storage unit 49 stores information concerning control of the inkjet printing apparatus 10, such as tables used for control of the transport controller 31, for example. In particular, the storage unit 49 stores patterns of speed change of the drive rollers 7, 9, 11, and 13. The transport controller 31 operates by reading these patterns from the storage unit 49. Each controller is realized by a processor such as a CPU. The transport controller 31 corresponds to the drive roller controller in this invention.

Figure 2:
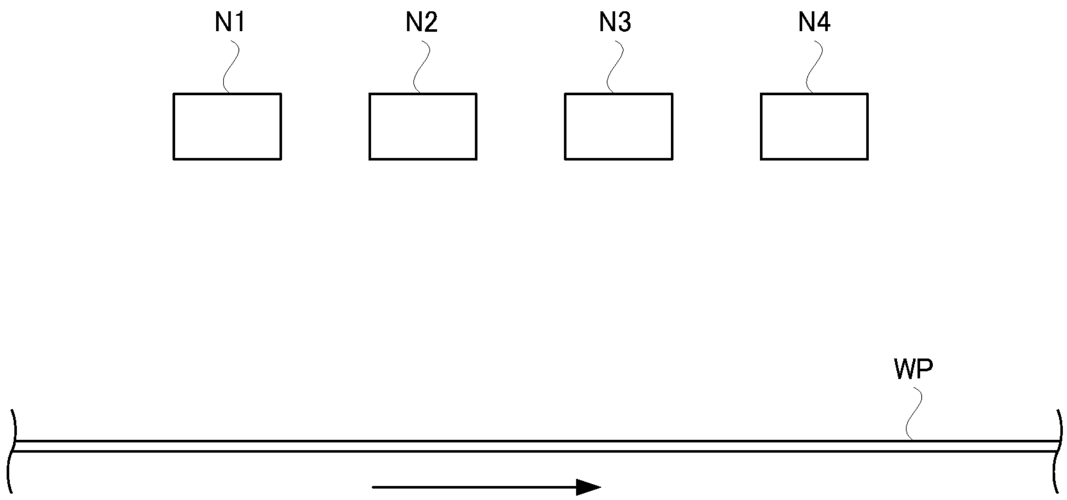
FIG. 2 shows a construction of a printing unit according to this invention.

FIG. 2 schematically depicts the nozzles provided for the printing unit 19. The printing unit 19 includes four line heads for black (K), cyan (C), magenta (M), and yellow (Y). The line heads are constructed of a plurality of nozzles arrayed in a direction perpendicular to the transport direction of web paper WP. Each nozzle has a dispenser hole for dispensing ink droplets. And four line heads are arrayed in the transport direction of web paper WP. FIG. 2 depicts one nozzle taken from each of the four line heads. Nozzle N1 to nozzle N4 belong to the different line heads. Therefore, nozzle N1 to nozzle N4 are constructed to dispense ink droplets of different color tones.

FIG. 3 to FIG. 6 illustrate an ordinary operation of the head controller 29. The ordinary operation is control of the printing unit 19 when the web paper WP is transported at a constant speed. For expediency, description will be made by taking two line heads out of the four line heads. According to FIG. 3 to FIG. 6, the two line heads are arranged in the transport direction of web paper WP. An upstream nozzle NU belonging to the upstream line head and a downstream nozzle ND belonging to the downstream line head are arranged at a predetermined interval (inter-nozzle distance Δd1) in the transport direction of web paper WP.

Figure 3:
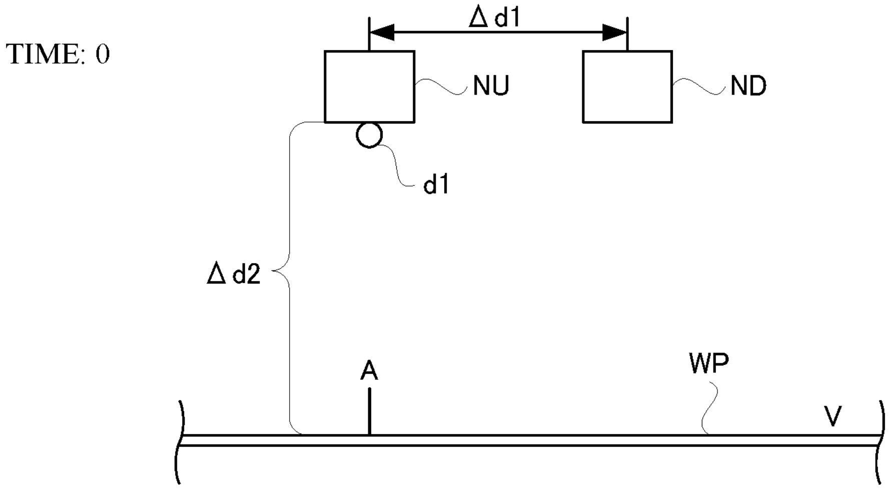
FIG. 3 shows a driving method for each nozzle when a transporting speed of web paper is constant according to this invention.

How printing is done will be described using these two nozzles NU and ND. FIG. 3 shows a situation immediately after ink droplets are dispensed. A vertical distance from the upstream nozzle NU to the web paper WP and a vertical distance from the downstream nozzle ND to the web paper WP are substantially the same (both assumed to be head gap Δd2). Further, a flight speed of a first ink droplet d1 dispensed from the upstream nozzle NU, and a flight speed of a second ink droplet d2 dispensed from the downstream nozzle ND are also substantially the same. As will be seen from FIG. 3, when printing is done by using the nozzles NU and ND, the upstream nozzle NU first dispenses the first ink droplet d1. The time of this occurrence is set to 0. Since the gap (head gap Δd2) is provided between the nozzles and web paper WP, the dispensed ink droplet takes a certain amount of time from dispensation to landing on the web paper WP (droplet flight time t obtained from the head gap Δd2 divided by the flight speed of the ink droplets). Since the web paper WP is transported at speed V in the meantime, the first ink droplet d1 dispensed from the upstream nozzle NU toward a position A on the web paper WP at time 0 does not land on the position A, but lands in a position different from the position A. The position A is a position where the trajectory (orbit) of the flight of the ink droplet and the web paper WP cross at the time the upstream nozzle NU dispenses the ink droplet d1.

Figure 4:
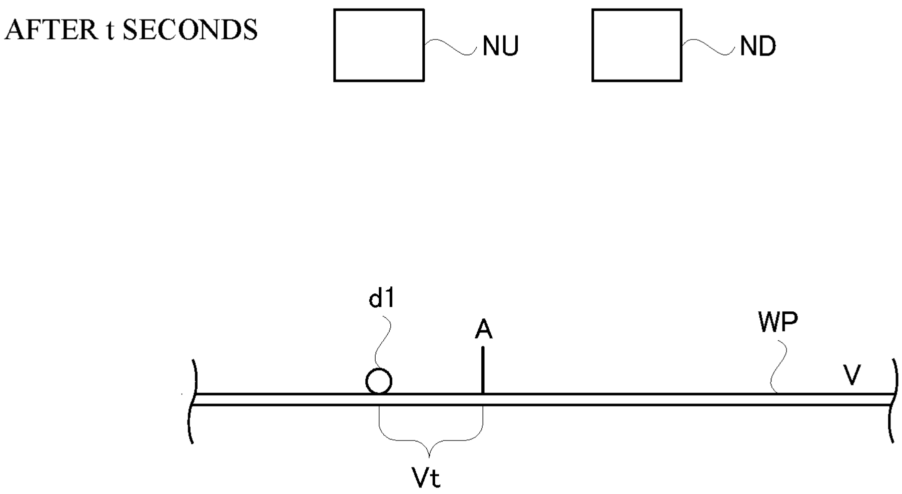
FIG. 4 shows the driving method for each nozzle when the transporting speed of the web paper is constant according to this invention.

FIG. 4 shows a point of time when the droplet flight time t has lapsed since the state of FIG. 3. When the droplet flight time t lapses after the state of FIG. 3, the first ink droplet d1 dispensed from the upstream nozzle NU lands on the web paper WP. Since the web paper WP is transported just a distance Vt during the droplet flight time t, the position where the first ink droplet d1 lands on the web paper WP will be a position that is just the distance Vt upstream from the position A.

Figure 5:
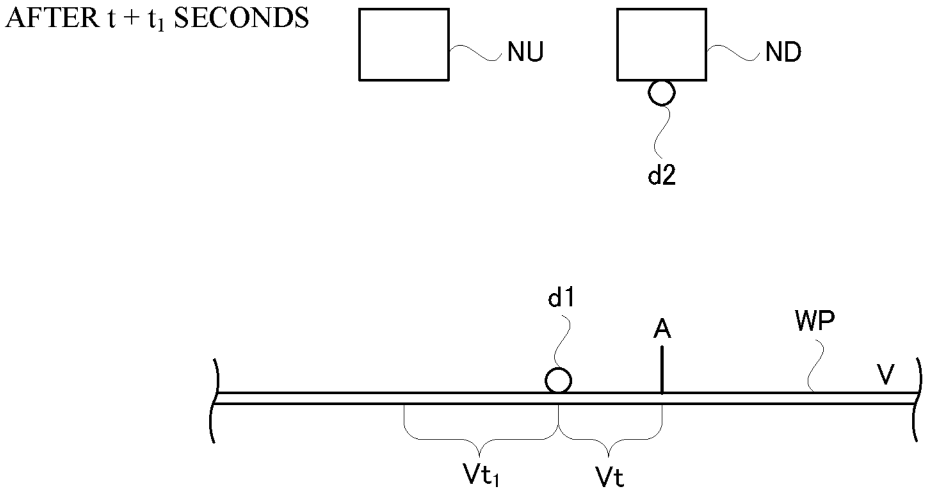
FIG. 5 shows the driving method for each nozzle when the transporting speed of the web paper is constant according to this invention.

FIG. 5 illustrates a subsequent situation. The head controller 29 causes the downstream nozzle ND to dispense a second ink droplet d2 successively. It is assumed, for example, that the head controller 29 causes the downstream nozzle ND to dispense the second ink droplet d2 at a time the position A has reached directly under the downstream nozzle ND. The time the position A has reached directly under the downstream nozzle ND means a time when, in practice, the transportation of web paper W has brought to the position A, a position in which the trajectory (orbit) of the flight of the ink droplet at the point of time the downstream nozzle ND dispensed the second ink droplet d2 crosses the web paper WP. The head controller 29 can easily recognize from the output of the encoder 18 whether the position A has reached directly under the downstream nozzle ND. It is assumed that the downstream nozzle ND dispenses the ink droplet d2 after lapse of a first time t1 from the state of FIG. 4. The first time t1 is a time obtained from the inter-nozzle distance Δd1 divided by the transporting speed V. The state of FIG. 5 therefore shows the result of a lapse of the droplet flight time t+first time $t_1$ from the state of FIG. 3. Incidentally, the landing position of the ink droplet relating to the upstream nozzle NU has moved just a distance $Vt_1$ downstream relative to the upstream nozzle NU during the lapse of the first time $t_1$.

Figure 6:
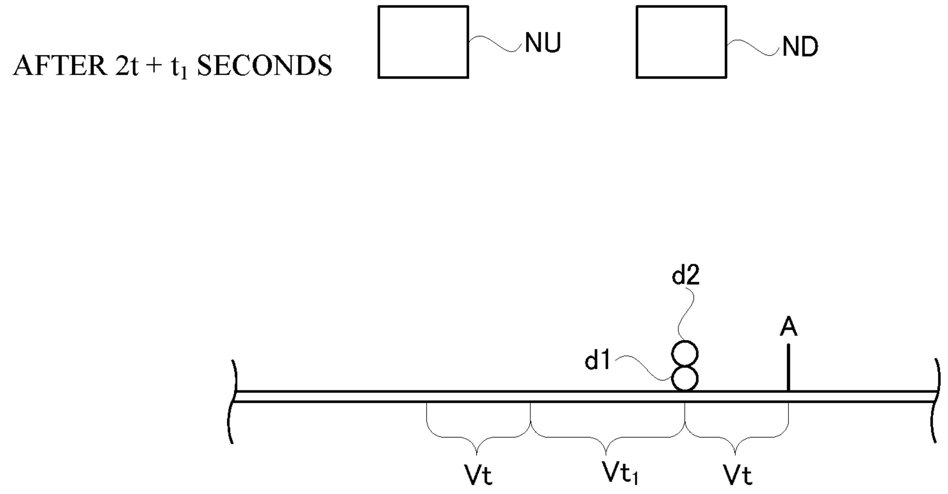
FIG. 6 shows the driving method for each nozzle when the transporting speed of the web paper is constant according to this invention.

FIG. 6 shows a point of time after a further lapse of the droplet flight time t from the state of FIG. 5. Upon lapse of the droplet flight time t from the state of FIG. 5, the second ink droplet d2 dispensed from the downstream nozzle ND will land on the web paper WP. Since the web paper WP has been transported just the distance Vt during the droplet flight time t, the landing position of the ink droplet on the web paper WP is a position just the distance Vt upstream from the position A. Consequently, the first ink droplet d1 dispensed from the upstream nozzle NU and the second ink droplet d2 dispensed from the downstream nozzle ND land in the same position on the web paper WP. The state of FIG. 6 is after a lapse of $2t+t_1$ (i.e. a sum of the droplet flight time t and the time ($t_1$+t) obtained from the inter-nozzle distance Δd1 divided by the transporting distance) from the state of FIG. 3.

Thus, each line head of the printing unit 19 is constructed for performing printing by dispensing ink droplets from the plurality of nozzles arranged as spaced in the transport direction of web paper WP to one point which is a specific position on the web paper WP. The ink droplets of different color tones are placed in superimposition in one point which is the specific position on the web paper WP.

The foregoing description is about the control of the printing unit 19 by the head controller 29 when the web paper WP is transported at constant transporting speed V. A feature of this embodiment lies in the ability to continue printing even during acceleration or deceleration of the web paper WP. The cases of speed changes of the web paper WP can be considered to include, for example, the cases of stopping transportation of the web paper WP, and starting transportation of the web paper WP at a standstill. FIG. 7 to FIG. 11 illustrate the case of decelerating the web paper WP as an example.

In the description of FIG. 7 to FIG. 11, it may be readable that a landing position of the first ink droplet d1 relating to the upstream nozzle NU and a landing position of the second ink droplet d2 relating to the downstream nozzle ND are not in agreement. This is due to a necessity of concisely describing the feature of the embodiment. In practice, as described hereinafter, this displacement is eliminated by controlling dispensation timing of the downstream nozzle ND. Or the amount of positional shift can be reduced.

Figure 7:
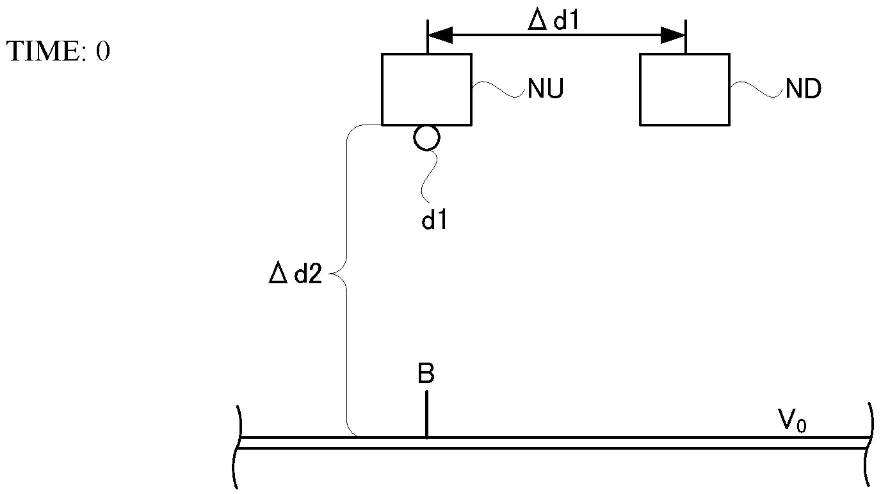
FIG. 7 shows a driving method for each nozzle when the transporting speed of the web paper changes according to this invention.

The state of FIG. 7 appears at a predetermined time after a deceleration of the web paper WP is started. The transporting speed of web paper WP at this time is $V_0$, which is slower than the transporting speed V in the description of FIG. 3 to FIG. 6. FIG. 7 shows a situation immediately after an ink droplet is dispensed. As seen from FIG. 7, when printing is performed using the nozzles NU and ND, the upstream nozzle NU dispenses the first ink droplet d1 in this case also. This time is set to 0. The first ink droplet d1 lands on the web paper WP after the droplet flight time t from its dispensation, which is the same as when the web paper WP is transported at the transporting speed V. The ink droplet the upstream nozzle NU dispenses toward position B on the web paper WP at time 0 does not land in position B, but lands in a position different from position B. Position B is a position where the trajectory (orbit) of the flight of the ink droplet crosses the web paper WP at the time the upstream nozzle NU dispenses the first ink droplet d1. Position B is, in reality, a position directly under the upstream nozzle NU at the time the upstream nozzle NU dispenses the first ink droplet d1. Position B will be called a specific position B in the following description.

Figure 8:
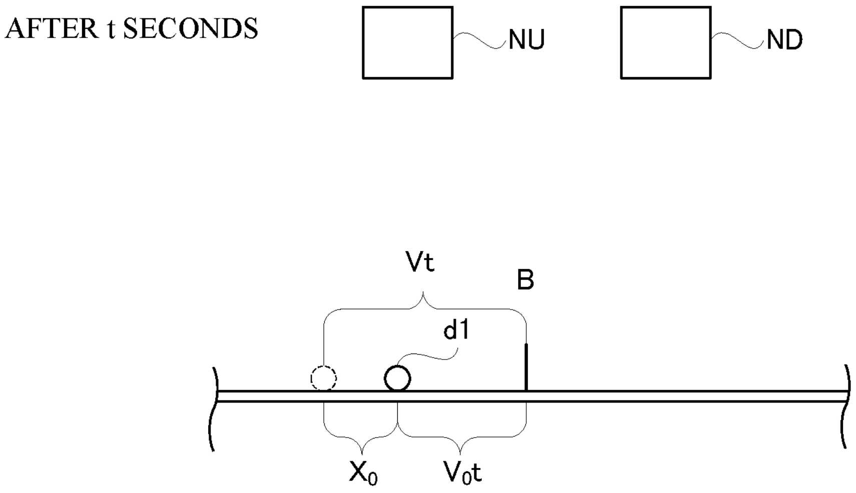
FIG. 8 shows the driving method for each nozzle when the transporting speed of the web paper changes according to this invention.

FIG. 8 shows a point of time upon lapse of the droplet flight time t from the state of FIG. 7. When the droplet flight time t lapses from the state of FIG. 7, the first ink droplet d1 dispensed from the upstream nozzle NU lands on the web paper WP. Since the web paper WP is transported just the distance $V_0$t during the droplet flight time t, the landing position of the ink droplet on the web paper WP corresponds to a position just the distance $V_0$t upstream from the specific position B. The ink droplet shown in a broken line in FIG. 8 is located in a site where landing should have occurred on the web paper WP if the web paper WP were transported at the transporting speed V (>transporting speed $V_0$). Since the transporting speed $V_0$ of the web paper WP is slower than the transporting speed V, the first ink droplet d1 lands before the position of the ink droplet in the broken line reaches directly under the upstream nozzle NU. The difference between the position of the ink droplet in the broken line and the actual position of the ink droplet will be called a first difference distance $X_0$. The rapidity of the flight speed of first ink droplet d1 and the minuteness of head gap Δd2 render the droplet flight time t an extremely short time (e.g. 100 ms to 200 ms). Therefore, the reduction of transporting speed V0 in the droplet flight time t can be disregarded.

Figure 9:
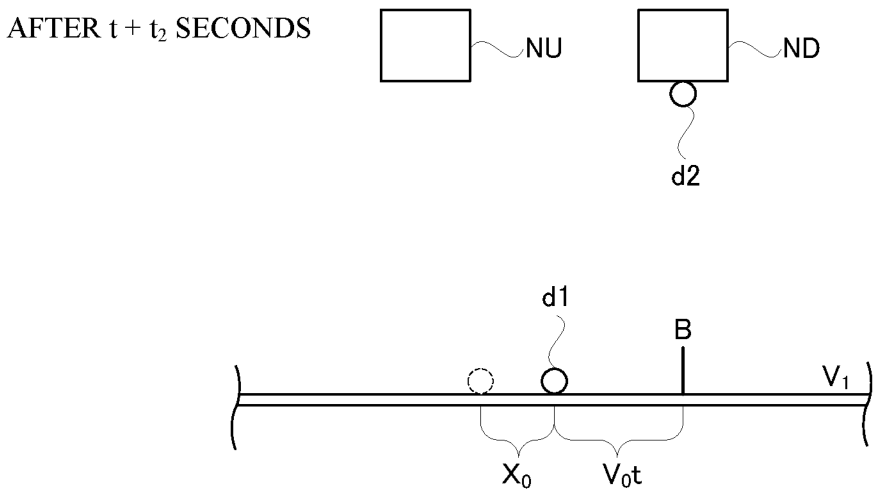
FIG. 9 shows the driving method for each nozzle when the transporting speed of the web paper changes according to this invention.

FIG. 9 illustrates a subsequent situation. The head controller 29 then causes the downstream nozzle ND to dispense the second ink droplet d2. The head controller 29 actually causes the downstream nozzle ND to dispense the second ink droplet d2 at the time the specific position B reaches directly under the downstream nozzle ND. The time the specific position B reaches directly under the downstream nozzle ND is actually a time when a position where the trajectory (orbit) of the flight of the ink droplet at the time of the downstream nozzle ND dispensing the ink droplet crosses the web paper WP becomes the position B by the transportation of the web paper WP. The head controller 29 can easily recognize from the output of the encoder 18 whether or not the position B has reached directly under the downstream nozzle ND. Also while such printing operation is performed, the transporting speed of the web paper WP continues lowering. The transporting speed of the web paper WP in FIG. 9 (that is, the transporting speed of web paper WP at the time of reference position B reaching directly under the downstream nozzle ND) is assumed to be $V_1$. The transporting speed $V_1$ is a speed slower than the transporting speed $V_0$.

It is assumed that the downstream nozzle ND dispenses the second ink droplet d2 after the lapse of a second time t2 from the state of FIG. 8. The second time t2 is a time taken for the transporting speed of the web paper WP to lower from V0 to V1, and is also a time taken for the specific position B to move to the position directly under the downstream nozzle ND after the time the first ink droplet D1 lands on the web paper WP. Consequently, the state of FIG. 9 shows a state upon lapse of the droplet flight time t+second time $t_2$ after the state of FIG. 7.

Figure 10:
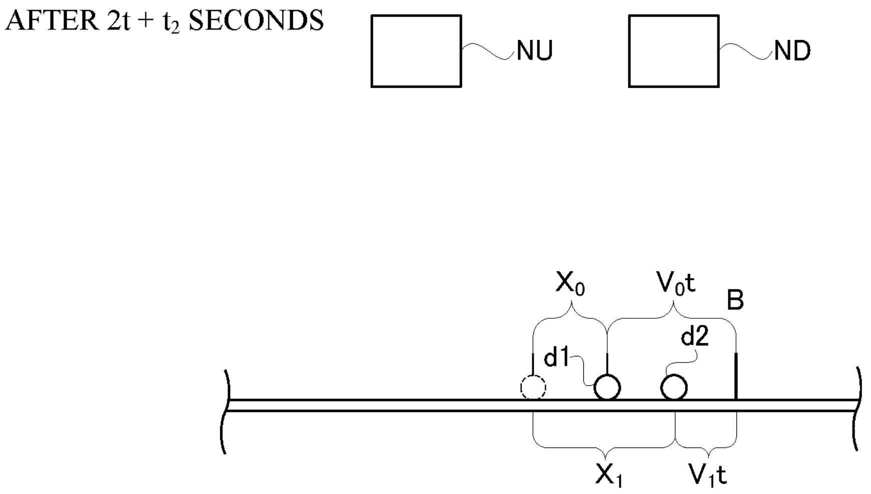
FIG. 10 shows the driving method for each nozzle when the transporting speed of the web paper changes according to this invention.

FIG. 10 shows a point of time upon lapse of the droplet flight time t from the state of FIG. 9. When the droplet flight time t lapses from the state of FIG. 9, the second ink droplet d2 dispensed from the downstream nozzle ND lands on the web paper WP. Since the web paper WP is transported just the distance $V_1$t during the droplet flight time t, the landing position of the second ink droplet d2 on the web paper WP is a position just the distance $V_1$t upstream from the position B. Thus, the first ink droplet d1 dispensed from the upstream nozzle NU and the second ink droplet d2 dispensed from the downstream nozzle ND land in different positions on the web paper WP. Since the transporting speed $V_1$ of the web paper WP is slower than V, the landing of the second ink droplet d2 occurs before the position of the ink droplet in the broken line reaches directly under the downstream nozzle ND. The difference between the position of the ink droplet in the broken line and the actual position of the second ink droplet d2 will be called a second difference distance $X_1$. Since the transporting speed $V_1$ of the web paper WP is slower than $V_0$, the second difference distance $X_1$ becomes larger than the first difference distance $X_0$. The state of FIG. 10 is a state after a lapse of 2t+$t_2$ (i.e. a sum of twice the droplet flight time t and the second time t2) from the state of FIG. 7.

Figure 11:
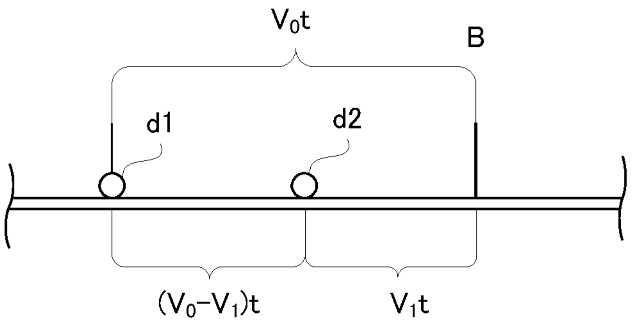
FIG. 11 shows the driving method for each nozzle when the transporting speed of the web paper changes according to this invention.

FIG. 11 illustrates a shift amount between the landing position of the first ink droplet d1 relating to the upstream nozzle NU and the landing position of the second ink droplet d2 relating to the downstream nozzle ND. First, the first ink droplet d1 relating to the upstream nozzle NU has landed in the position just the distance $V_0$t upstream from the position B on the web paper WP. And the second ink droplet d2 relating to the downstream nozzle ND has landed in the position just the distance $V_1$t upstream from the position B on the web paper WP. Since the transporting speed $V_1$ is slower than the transporting speed $V_0$, the distance $V_1$t becomes shorter than the distance $V_0$t. The difference between the landing positions of these two ink droplets is distance $(V_0-V_1)$t.

In this embodiment, the most characteristic feature lies in that, during a speed change of the web paper WP, the transport controller 31 controls the drive rollers 7, 9, 11, and 13 to make constant at each point of time during the speed change of the drive rollers 7, 9, 11, and 13, a speed difference D which is a difference between the first speed $V_A$ which is the transporting speed of web paper WP when the upstream nozzle NU dispenses the first ink droplet d1 and the second speed $V_B$ which is the transporting speed of web paper WP when the downstream nozzle ND dispenses the second ink droplet d2 corresponding to the first ink droplet d1.

In other words, this embodiment is characterized in that the drive rollers 7, 9, 11, and 13 are controlled to make constant at each point of time during the speed change of the drive rollers 7, 9, 11, and 13, a speed difference D which is a difference between the first speed $V_A$ which is the transporting speed of web paper WP at the time the first ink droplet d1 dispensed from the upstream nozzle NU lands on the web paper WP and the second speed $V_B$ which is the transporting speed of web paper WP at the time the specific position B, which was located directly under the upstream nozzle NU when the first ink droplet d1 was dispensed, is located directly under the downstream nozzle ND.

To state more generally, the drive rollers 7, 9, 11, and 13 are controlled such that a speed difference of the transporting speed of web paper WP while a point of focus set to the web paper WP passes between two given points set along the transport path of web paper WP becomes constant at each point of time during the speed change of the drive rollers 7, 9, 11, and 13.

Figure 12:
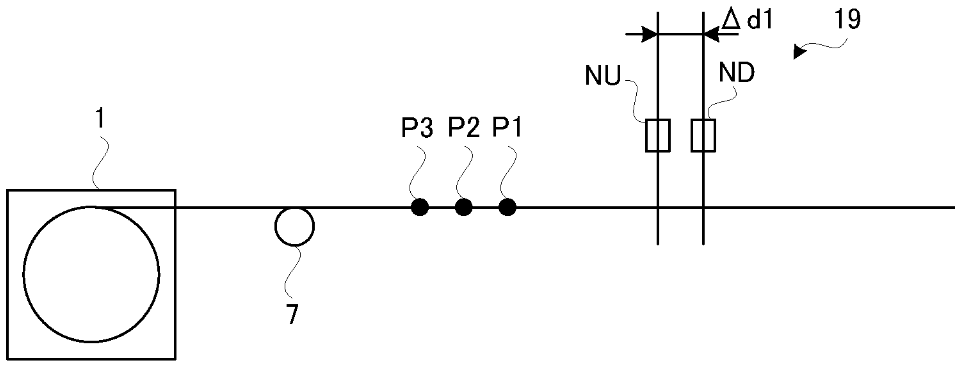
FIG. 12 shows a relationship between transporting speed and transporting distance according to this invention.

FIG. 12 is a model figure simplifying the transport path of web paper WP of the inkjet printing apparatus 10 according to this embodiment. As shown in FIG. 12, the web paper WP held in the paper feeder 1 is drawn out and transported toward the printing unit 19 by the drive roller 7 (the other drive rollers 9, 11, and 13 being omitted). As noted hereinbefore using FIG. 7 to FIG. 11, the upstream nozzle NU and downstream nozzle ND of the printing unit 19 are separated just the inter-nozzle distance Δd1 apart in the transport direction. Points of focus P1-P3 are set on the web paper WP. Although the intervals between the points of focus P1-P3 may be arbitrary, they are assumed, for the convenience of description, to be separated the inter-nozzle distance Δd1 apart from one another.

Figure 13:
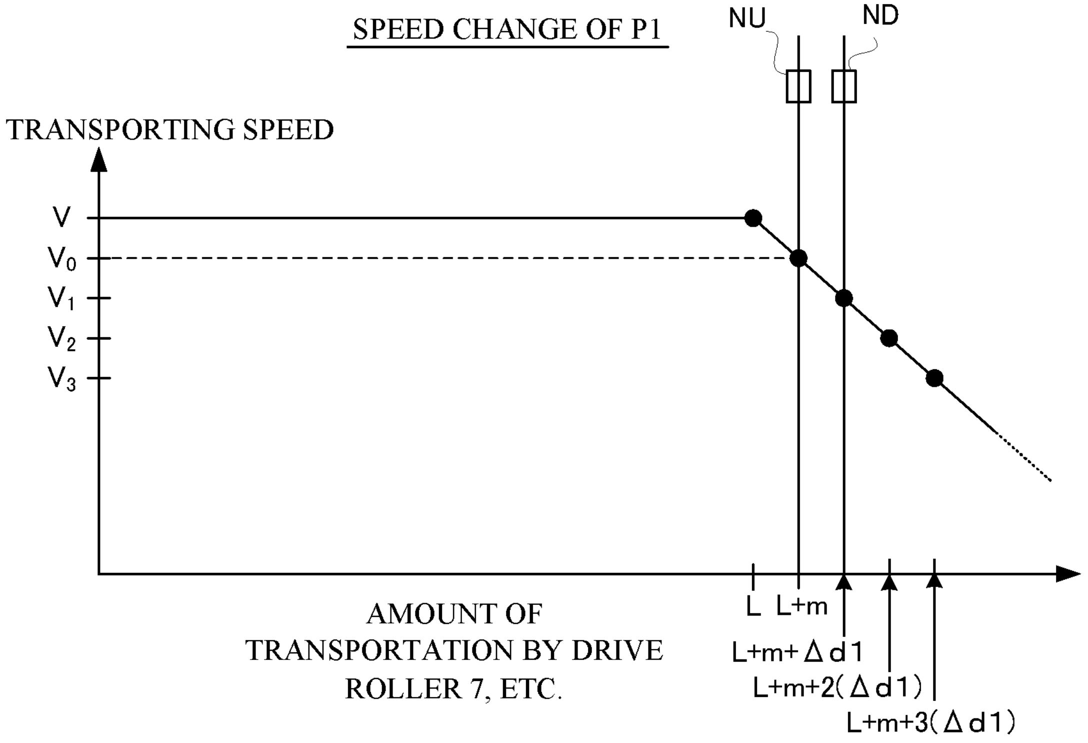
FIG. 13 shows the relationship between transporting speed and transporting distance according to this invention.
Figure 14:
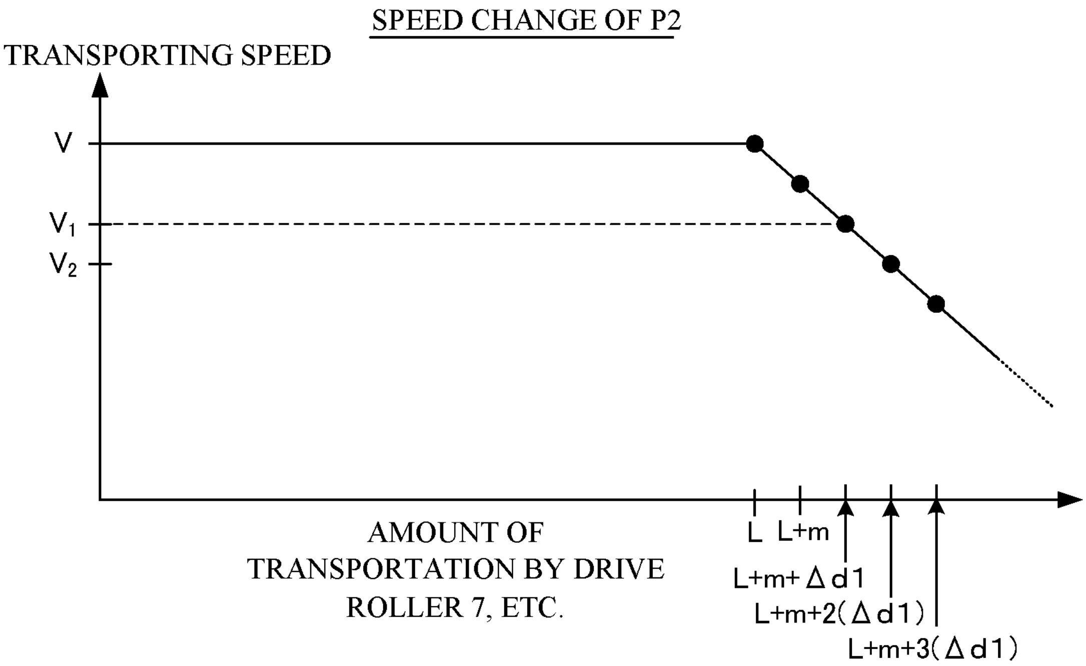
FIG. 14 shows the relationship between transporting speed and transporting distance according to this invention.
Figure 15:
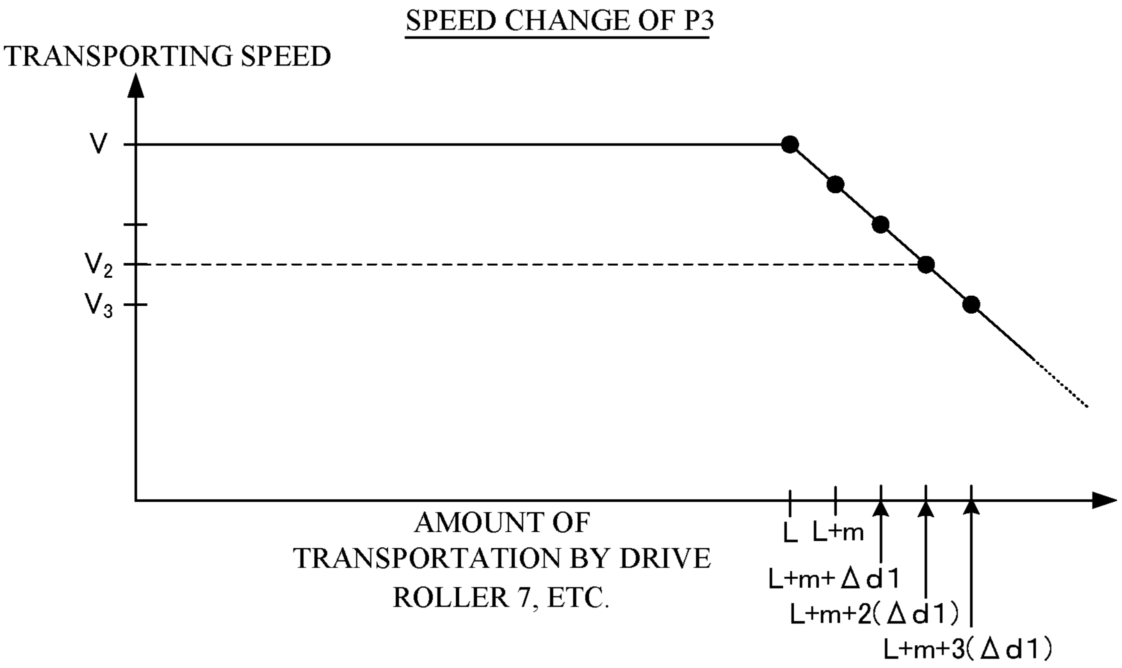
FIG. 15 shows the relationship between transporting speed and transporting distance according to this invention.

FIG. 13 to FIG. 15 are graphs correlating amounts of transportation of web paper WP and transporting speeds of web paper WP. FIG. 13 shows variations of the transporting speed of web paper WP when attention is directed to the point of focus P1. The point of focus P1 on the web paper WP moves downstream from upstream as the transport roller 7 transports the web paper WP.

The point of focus P1 will be described first. As shown in FIG. 13, the drive roller 7 moves the web paper WP at constant speed V until the web paper WP is drawn a predetermined length L out of the paper feeder 1. After the drive roller 7 draws out the predetermined length L, the drive roller 7 gradually reduces the transporting speed of web paper WP. The variation in the transporting speed relative to the amount of transportation of the web paper WP is uniform. That is, the relationship between transporting distance and transporting speed can be given in a linear expression. When the web paper WP is further transported a predetermined length m, the point of focus P1 reaches directly under the upstream nozzle NU (amount of transportation L+m). The transporting speed of web paper WP at this point of time is speed V0 (state of FIG. 7). The upstream nozzle NU dispenses the first ink droplet d1 at this time. When the web paper WP is further drawn out the inter-nozzle distance Δd1, the point of focus P1 reaches directly under the downstream nozzle ND (amount of transportation L+m+Δd1). The transporting speed of web paper WP at this point of time is speed $V_1$ (state of FIG. 9). The downstream nozzle ND dispenses the second ink droplet d2 at this time. As noted hereinbefore using FIG. 11, the difference in landing position between the first ink droplet d1 and second ink droplet d2 becomes distance $(V_0-V_1)t$.

It is assumed that the drive roller 7 further transports the web paper WP the inter-nozzle distance Δd1 (amount of transportation L+m+2(Δd1)). The transporting speed lowers from $V_1$ to $V_2$. Since the relationship between transporting distance and transporting speed can be given in a linear expression, the speed difference $(V_1-V_2)$ is equal to the speed difference $(V_0-V_1)$.

Assume that the drive roller 7 further transports the web paper WP the inter-nozzle distance Δd1 (amount of transportation L+m+3(Δd1)). The transporting speed lowers from $V_2$ to $V_3$. Since the relationship between transporting distance and transporting speed can be given in a linear expression, the speed difference $(V_2-V_3)$ is equal to the speed difference $(V_0-V_1)$ and speed difference $(V_1-V_2)$.

In this embodiment, the drive rollers 7, 9, 11, and 13 are controlled such that a speed difference in the transporting speed of web paper WP while a given point of focus on the web paper WP moves between two given points (e.g. the upstream nozzle NU and downstream nozzle ND) set along the transport path becomes constant at each point of time during the speed change of the drive rollers 7, 9, 11, and 13. As shown in FIG. 14, for example, the transporting speed of web paper WP at the time the point of focus P2 reaches directly under the upstream nozzle NU is $V_1$, and the transporting speed of web paper WP at the time it reaches directly under the downstream nozzle NU is $V_2$. However, the speed difference $(V_1-V_2)$ is equal to the above-noted speed difference $(V_0-V_1)$. Consequently, the difference $(V_0-V_1)t$ in the landing position between the first droplet d1 and second droplet d2 when ink dispensing control is carried out based on the point of focus P1 regarded as the specific position B becomes equal to the difference $(V_1-V_2)t$ in landing position between the first droplet d1 and second droplet d2 when ink dispensing control is carried out based on the point of focus P2 regarded as the specific position B.

Similarly, as shown in FIG. 15, the transporting speed of web paper WP at the time the point of focus P3 reaches directly under the upstream nozzle NU is $V_2$, and the transporting speed of web paper WP at the time it reaches directly under the downstream nozzle NU is $V_3$. However, the speed difference $(V_2-V_1)$ is equal to the above-noted speed difference $(V_0-V_1)$. Consequently, the difference $(V_2-V_3)t$ in landing position between the first droplet d1 and second droplet d2 when ink dispensing control is carried out based on the point of focus P3 regarded as the specific position B becomes equal to the difference $(V_1-V_2)t$ in landing position between the first droplet d1 and second droplet d2 when ink dispensing control is carried out based on the point of focus P2 regarded as specific position B 1.

An advantage of setting speed in this way will be described. In the description using FIG. 7 to FIG. 11, the difference in landing position between the two ink droplets was $(V_0-V_1)t$. The speed difference in this case is $V_0-V_1$ which is, in this embodiment, equal to the speed difference D used as a constant. The speed difference D is equal to the speed difference between a given transporting speed $V_X$ at the time the upstream nozzle NU dispenses the ink droplet during deceleration of the web paper WP and a transporting speed $V_Y$ at the time the downstream nozzle ND dispenses the ink droplet corresponding to the ink droplet of the upstream nozzle NU. Consequently, the difference in landing position between the two ink droplets is always Dt which is constant.

It is easy to control the drive rollers 7, 9, 11, and 13 to eliminate this difference in landing position. Since the difference in landing position is always constant during speed change of the web paper WP, the difference in landing position is eliminated by changing the dispensation timing of the ink droplets of the nozzles accordingly. More particularly, the dispensation timing of the downstream nozzle ND may be adjusted after the upstream nozzle NU dispenses the ink droplet. In the description of FIG. 7 to FIG. 11, the downstream nozzle ND dispenses the ink droplet at a point of time the specific position B reaches directly under the downstream nozzle ND. Instead of this, the downstream nozzle ND may be made to dispense the ink droplet after waiting for the web paper WP to be further transported the distance Dt from the point of time the specific position B reaches directly under the downstream nozzle ND. Then, an agreement will be achieved between the landing position of the ink droplet relating to the upstream nozzle NU and the landing position of the ink droplet relating to the downstream nozzle ND. The transport controller 31 can easily determine, by referring to an output of the encoder 18, whether or not the web paper WP has been transported the distance Dt. By making such a change of control at each point of time during speed change of the web paper WP, the landing position of the ink droplet relating to the upstream nozzle NU and the landing position of the ink droplet relating to the downstream nozzle ND will always be in agreement.

Figure 16:
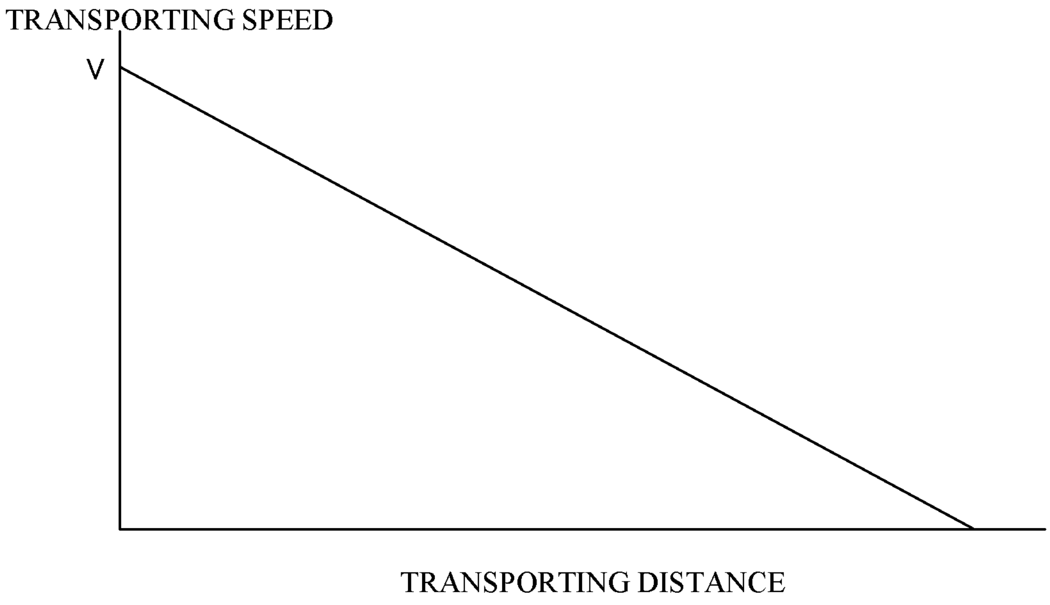
FIG. 16 shows the relationship between transporting speed and transporting distance according to this invention.

FIG. 16 shows a graph of speed variations occurring when stopping transportation of the web paper WP having been transported at the constant transporting speed V. The horizontal axis represents the distance (transporting distance) a certain position on the web paper WP is transported from the point of time when a speed change is started. The longer this distance is, the nearer the transportation of web paper WP approaches a stopped state. The vertical axis is the transporting speed of web paper WP. The relationship between the transporting distance and transporting speed in this embodiment is given in a linear expression. When the speed change of web paper WP is performed in such a mode, the speed difference between the transporting speed at the time the upstream nozzle NU dispenses the ink droplet and the transporting speed at the time downstream nozzle ND dispenses the ink droplet corresponding to the former ink droplet becomes constant at any point of time during the speed change.

A specific construction of the transport controller 31 for realizing such speed change will be described. The storage unit 49 stores tables correlating the speed and time regarding the transport control, the number of tables corresponding to the modes of speed change. The modes of speed change are modes produced by changing the classification of acceleration or deceleration, initial speed, target speed, and time taken from the initial speed to the target speed. The inkjet printing apparatus 10 according to the embodiment includes the console 47 for inputting instructions for changing the transporting speed of web paper WP. The transport controller 31 reads the table corresponding to the mode of speed change instructed through the console 47, and controls the drive rollers 7, 9, 11, and 13.

Next, description will be made of an operation of the head controller 29 during a speed change of the web paper WP. The head controller 29 is provided with a constant speed mode which is a control mode while the transporting speed of web paper WP is constant, and a speed change mode which is a control mode while the transporting speed of web paper WP is changing. In the constant speed mode, the head controller 29 controls each nozzle in the mode described in FIG. 3 to FIG. 6. And, in the speed change mode, each nozzle is controlled to eliminate the above-noted distance Dt of separation between the landing positions of the two ink droplets. When the transporting speed of web paper WP is constant, the head controller 29 controls each head in the constant speed mode. When instructions for a transportation stop of the web paper WP are given from the console 47, for example, the head controller 29 performs control of each nozzle by switches the control mode from the constant speed mode to the speed change mode. A specific control method in each mode is stored in the storage unit 49. The head controller 29 operates by reading required data for the control from the storage unit 49.

Thus, the head controller 29 controls the printing unit 19 based on the output of the encoder 18, after the upstream nozzle NU dispenses the ink droplet toward the specific position B on the web paper WP, and at the point of time the specific position B has been transported just the predetermined distance, to cause the downstream nozzle ND to dispense the ink droplet. More particularly, the head controller 29 controls dispensation timing of the ink droplet from the downstream nozzle ND to realize an agreement between the first landing position which is the landing position on the web paper WP of the ink droplet dispensed from the upstream nozzle NU and the second landing position which is the landing position on the web paper WP of the ink droplet dispensed from the downstream nozzle ND.

As noted above, the head controller 29 operates according to any one of a plurality of control modes including at least the constant speed mode which is the control mode of the printing unit 19 while the transporting speed of web paper WP is constant, and the speed change mode which is the control mode of the printing unit 19 while the transporting speed of web paper WP is changing, and switches the control mode from the constant speed mode to the speed change mode when an input is made to the console 47.

In FIG. 16, the transporting speed finally becomes 0. The dispensation of ink droplets ends before the transporting speed becomes 0. That is, the head controller 29 ends the dispensation of ink droplets by the nozzles before it becomes impossible for a position just Dt upstream from the position B to reach the downstream nozzle ND. This is because, otherwise, the landing position of the ink droplet of the upstream nozzle NU and the landing position of the ink droplet of the downstream nozzle ND would shift relative to each other.

As described above, with the inkjet printing apparatus according to this invention, printing can be continued even during a speed change of web paper WP. That is, according to this invention, the transport controller 31 controls the drive rollers 7, 9, 11, and 13 to make constant at each point of time during the speed change of the drive rollers 7, 9, 11, and 13, the speed difference D which is a difference between the first speed which is the transporting speed of web paper WP when the upstream nozzle NU dispenses the first ink droplet d1 and the second speed which is the transporting speed of web paper WP when the downstream nozzle ND dispenses the second ink droplet d2 corresponding to the first ink droplet d1. In this way, a constant relationship is realized, at each point of time during the speed change of drive rollers 7, 9, 11, and 13, between the landing position on the web paper WP of the ink droplet relating to the upstream nozzle NU and the landing position on the web paper WP of the ink droplet relating to the downstream nozzle ND. Consequently, the tinge and the like of prints on the web paper WP will never change during the speed change of web paper WP, thus assuring high quality printing.

This invention is not limited to the construction in the foregoing embodiment, but may be modified as follows.

(1) In the foregoing embodiment, the head controller 29 is constructed to use the constant speed mode and speed change mode separately. This invention is not limited to this construction. The head controller 29 may, during the speed change of the drive rollers 7, 9, 11, and 13, control manipulation of ink droplet dispensation timing of the printing unit 19 by the same control as when the transporting speed of web paper WP is constant. In this way, the control of the apparatus can be further simplified.

(2) In the foregoing embodiment, the transport controller 31 operates by reading the tables stored in the storage unit 49. This invention is not limited to this construction. A plurality of functions may be stored in the storage unit 49, whereby the transport controller 31 is operable with reference to these.

(3) In the foregoing embodiment, the time of deceleration of the web paper WP has been described as an example. This invention is applicable also to the time of acceleration of the web paper WP. Further, it is not necessary to set the speed after a speed change to 0 as in the foregoing embodiment. In this case, the head controller 29 may return the operation from the speed change mode to the constant speed mode in response to the transporting speed becoming constant.

(4) In the foregoing embodiment, the transport controller 31 recognizes the speed change of web paper WP from an input made to the console 47. This invention is not limited to this construction. For example, the transport controller 31 may recognize the speed change of web paper WP based on a signal emitted from the takeup roller 5 relating to deceleration or acceleration of printing. Such a signal is emitted, for example, when the process of the takeup roller 5 fails to keep pace with the printing. The printing apparatus body 3 in this modified example has an input terminal for receiving such signal from the takeup roller 5, and the transport controller 31 recognizes the speed change of web paper WP from whether or not the signal is inputted to this input terminal.

(5) As a modified example about the above modified example of (4), the transport controller 31 may be constructed to recognize the speed change of web paper WP based on the main controller 45. As an example in which the main controller 45 transmits a signal about deceleration or acceleration of the printing to the transport controller 31, the time of starting or finishing a job can be cited for example.

(6) In the foregoing modified example, the printing unit 19 is provided with individual line heads for black (K), cyan (C), magenta (M), and yellow (Y). This invention is not limited to this construction. Line heads corresponding to color tones different from these may be provided, or a plurality of line heads for the same color tone may be provided.

REFERENCE SIGNS LIST

7, 9, 11, 13 drive rollers
10 inkjet printing apparatus
18 encoder
19 printing unit
29 head controller (printing unit controller)
31 transport controller (drive roller controller)

What is claimed is:

1. An inkjet printing apparatus for executing printing by dispensing ink droplets to a printing medium in transportation, comprising:

drive rollers arranged along a transport path of the printing medium for transporting the printing medium;

an encoder for measuring transporting distances of the printing medium by the drive rollers;

a printing unit having an upstream nozzle located upstream in the transport path, and a downstream nozzle located downstream of the upstream nozzle in the transport path;

a printing unit controller for controlling the printing unit based on an output of the encoder, after the upstream nozzle dispenses an ink droplet toward a specific position on the printing medium, to cause the downstream nozzle to dispense an ink droplet at a point of time the specific position has been transported just a predetermined distance; and a drive roller controller for controlling speed change of the drive rollers in order to control a transporting speed of the printing medium, wherein the drive roller controller is configured to control the drive rollers to make constant at each point of time during the speed change of the drive rollers, a speed difference which is a difference between a first speed which is a transporting speed of the printing medium when the upstream nozzle dispenses the ink droplet and a second speed which is a transporting speed of the printing medium when the downstream nozzle dispenses the ink droplet, and, thereby printing in a constant relationship between a landing position on the printing medium of the ink droplet relating to the upstream nozzle and a landing position on the printing medium of the ink droplet relating to the downstream nozzle during the speed change of the drive rollers.

2. The inkjet printing apparatus according to claim 1, wherein the printing unit controller is configured to control dispensation timing of the ink droplet from the downstream nozzle to realize an agreement between a first landing position which is a landing position on the printing medium of the ink droplet dispensed from the upstream nozzle and a second landing position which is a landing position on the printing medium of the ink droplet dispensed from the downstream nozzle.

3. The inkjet printing apparatus according to claim 1, further comprising an input unit for inputting instructions to change the transporting speed of the printing medium, wherein the printing unit controller is configured to operate according to one of a plurality of control modes including at least a constant speed mode which is a control mode of the printing unit while the transporting speed of the printing medium is constant, and a speed change mode which is a control mode of the printing unit while the transporting speed of the printing medium is changing, and to switch the control mode from the constant speed mode to the speed change mode when an input is made to the input unit.

4. The inkjet printing apparatus according to claim 1, wherein the printing unit controller is configured, during the speed change of the drive rollers, to control manipulation of ink droplet dispensation timing of the printing unit by the same control as when the transporting speed of the printing medium is constant.

5. The inkjet printing apparatus according to claim 1, comprising a storage unit for storing patterns of the speed change of the drive rollers, wherein the drive roller controller is operable by reading the patterns from the storage unit.

* * * * *